US009756536B2

(12) United States Patent
Li et al.

(10) Patent No.: US 9,756,536 B2
(45) Date of Patent: Sep. 5, 2017

(54) METHOD AND APPARATUS FOR MANAGING INFORMATION IN A COMMUNICATION SYSTEM (75) Inventors: Haitao Li, Beijing (CN); Mika Rinne, Espoo (FI); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/411,412

(22) PCT Filed: Jul. 16, 2012

(86) PCT No.: PCT/CN2012/078709
§ 371 (c)(1),
(2), (4) Date: Dec. 26, 2014

(87) PCT Pub. No.: WO2014/012208
PCT Pub. Date: Jan. 23, 2014

(65) Prior Publication Data
US 2015/0139189 A1    May 21, 2015

(51) Int. Cl.
*H04W 36/04*  (2009.01)
*H04W 36/00*  (2009.01)
*H04W 88/08*  (2009.01)
*H04W 92/20*  (2009.01)

(52) U.S. Cl.
CPC ....... *H04W 36/04* (2013.01); *H04W 36/0016* (2013.01); *H04W 36/0055* (2013.01); *H04W 88/085* (2013.01); *H04W 92/20* (2013.01)

(58) Field of Classification Search
CPC ............ H04W 36/04; H04W 36/0016; H04W 36/0055; H04W 88/085; H04W 92/20
See application file for complete search history.

(56) References Cited

U.S. PATENT DOCUMENTS

| 2009/0061878 | A1* | 3/2009 | Fischer | G08C 17/02 455/436 |
| 2012/0034925 | A1* | 2/2012 | Noh | H04W 36/30 455/444 |
| 2012/0040677 | A1* | 2/2012 | Chen | H04W 76/04 455/436 |
| 2012/0100853 | A1* | 4/2012 | Xiong | H04W 48/16 455/436 |

(Continued)

FOREIGN PATENT DOCUMENTS

CN    102123434 A    7/2011
CN    102215473 A    10/2011

OTHER PUBLICATIONS

International Search Report and Written Opinion received for corresponding Patent Cooperation Treaty Application No. PCT/CN2012/078709, dated Apr. 25, 2013, 11 pages.

*Primary Examiner* — Curtis A Alia
(74) *Attorney, Agent, or Firm* — Harrington & Smith (57) ABSTRACT

In accordance with an example embodiment of the present invention in a heterogeneous network, there is provided an apparatus, comprising a receiver configured to receive information from a local access point, the information comprising system information of a macro base station associated with the local access point. The information may be received responsive to a request and/or the information may comprise full system information. The at least one processing core may cause the apparatus to participate in a procedure with the macro base station based at least in part on the information.

16 Claims, 6 Drawing Sheets

(56) References Cited

U.S. PATENT DOCUMENTS

2012/0106516 A1* 5/2012 Jung .................... H04W 48/08
370/331
2012/0258757 A1* 10/2012 Qiu ................... H04W 36/0077
455/517

* cited by examiner

610 receiving information from a local access point, the information comprising system information of a macro base station associated with the local access point, wherein at least one of the information is received responsive to a request and the information comprises full system information

620 causing an apparatus to participate in a procedure with the macro base station based at least in part on the information

FIGURE 6

METHOD AND APPARATUS FOR MANAGING INFORMATION IN A COMMUNICATION SYSTEM

RELATED APPLICATION

This application was originally filed as Patent Cooperation Treaty Application No. PCT/CN2012/078709 filed Jul. 16, 2012.

TECHNICAL FIELD

The present application relates generally to managing information in communication systems, such as for example cellular communication systems.

BACKGROUND

Wireless communication relies on a wireless medium, such as a radio channel, to convey information from a first device to a second device. An example of a wireless communication system is a cellular communication system comprising cells controlled by base stations, wherein mobile stations, also known as mobiles, roam in cell coverage areas of cells. A mobile may change attachment from a first cell to a second cell as it moves around in the overall coverage area of the cellular communication system. A change in attachment may be referred to as a handover or handoff. In handover, a mobile may be handed over from a source base station to a target base station.

In some cellular communication systems, a mobile may communicate with more than one cell at a time. For example, where a mobile receives transmission from more than one cell, it may be considered to be in a soft or softer handoff situation. In some systems, a carrier aggregation may be defined comprising carriers from more than one cell to increase a throughput rate of data to a mobile.

In some cellular communication systems, base stations are configured to broadcast information to facilitate mobiles' attachment to cells controlled by the base stations. Since the information is broadcast, it may be received even by mobiles not attached to the cells. The broadcasted information may comprise, for example, cell identities, network identities and other information useful for attaching to the cells.

Some cellular communication systems comprise base stations which are connected to base station controllers. The base station controllers may be connected to a core network. Some cellular communication systems comprise base stations that are directly connected to the core network. The core network may be configured to provide network-level functionalities such as subscriber information management, access authentication, billing, switching and gateway connectivity to further networks, such as for example the internet. Base stations, and base station controllers in systems where they are present, may be collectively referred to as a radio-access network. The radio-access network may in general be configured to provide connectivity for mobiles in the coverage area of the radio-access network. The radio-access network may be configured to rely on the core network for network-level functionalities.

Some cellular communication systems comprise radio-access networks with a hierarchical structure in that the radio-access networks comprise two kinds of base stations, macro base stations and local access points. Macro base stations may perform a role similar to base stations in cellular communication systems with only one kind of base station. Local access points may be controlled by macro base stations, and may be configured to enhance access, throughput or quality in a coverage area that is geographically more limited than a cell coverage area of a cell controlled by a macro base station, for example. Radio-access networks with a hierarchical structure, or cellular communication systems comprising such radio-access networks, may be referred to as heterogeneous networks.

SUMMARY

Various aspects of examples of the invention are set out in the claims.

According to a first aspect of the present invention, there is provided an apparatus, comprising a receiver configured to receive information from a local access point, the information comprising system information of a macro base station associated with the local access point, wherein at least one of the receiver is configured to receive the information responsive to a request and the information comprises full system information, and at least one processing core configured to cause the apparatus to participate in a procedure with the macro base station based at least in part on the information.

According to a second aspect of the present invention, there is provided an apparatus, comprising at least one processor and at least one memory including computer program code, the at least one memory and the computer program code configured to, with the at least one processor, cause the apparatus to at least provide information comprising system information of a macro base station associated with the apparatus to a user equipment, wherein at least one of the information is provided responsive to a request and the information comprises full system information of the macro base station; and receive the information from the macro base station.

According to a third aspect of the present invention, there is provided an apparatus, comprising at least one processor and at least one memory including computer program code, the at least one memory and the computer program code configured to, with the at least one processor, cause the apparatus to at least provide information comprising system information of the apparatus to a local access point communicably connected with the apparatus, wherein at least one of the information is provided responsive to a request and the information comprises full system information of the apparatus, and participate in a procedure with a user equipment, wherein the user equipment is not in radio contact with the apparatus.

According to a fourth aspect of the present invention, there is provided a method, comprising receiving information from a local access point, the information comprising system information of a macro base station associated with the local access point, wherein at least one of the information is received responsive to a request and the information comprises full system information, and causing an apparatus to participate in a procedure with the macro base station based at least in part on the information.

According to a fifth aspect of the present invention, there is provided a method, comprising providing information comprising system information of a macro base station associated with an apparatus to a user equipment, wherein at least one of the information is provided responsive to a request and the information comprises full system information of the macro base station, and receiving the information from the macro base station.

According to a sixth aspect of the present invention, there is provided a method, comprising providing information comprising system information of an apparatus to a local access point communicably connected with the apparatus, wherein at least one of the information is provided responsive to a request and the information comprises full system information of the apparatus, and participating in a procedure with a user equipment, wherein the user equipment is not in radio contact with the apparatus.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
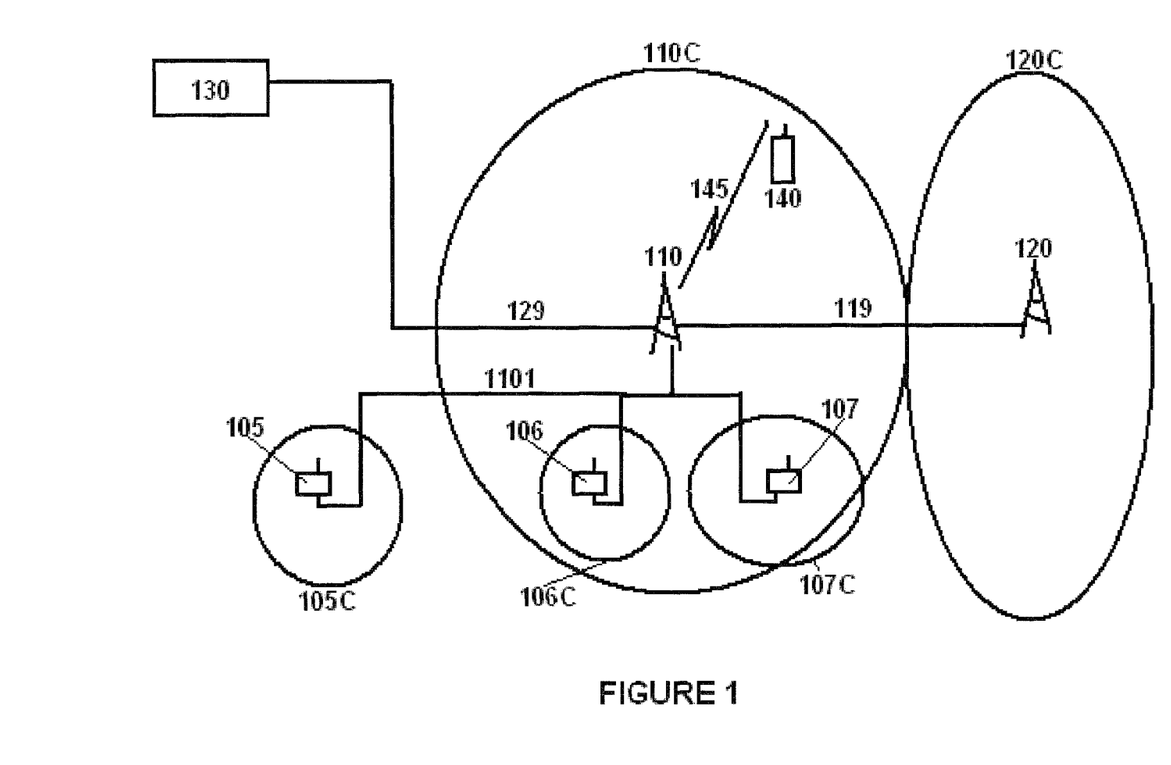
FIG. 1 illustrates an example system capable of supporting at least some embodiments of the invention.

FIG. 1 illustrates an example system capable of supporting at least some embodiments of the invention. Illustrated is base station 110, which may comprise a macro base station configured to operate in accordance with a radio access technology, such as for example wideband code division multiple access, WCDMA, long term evolution, LTE, or another cellular or non-cellular radio access technology. Mobile 140 is illustrated as being disposed inside a cell coverage area of cell 110C, cell 110C being controlled by base station 110. Cell 110C operates in accordance with the same technology as base station 110, for example where base station 110 operates in accordance with the LTE technology, cell 110C is an LTE cell. Cell 110C, or in general cells controlled by base station 110, may be referred to as a macro cell. Mobile 140, in order to be capable of accessing cell 110C, must be capable of operating in accordance with the same technology as cell 110C. Mobile 140 may be capable of operating in accordance with more than one technology, in which case mobile 140 may be referred to as a multi-mode mobile. Mobile 140 may comprise a cellular telephone, smartphone, tablet or laptop computer, data dongle, data modem or another similar device, for example.

Wireless link 145 connects base station 110 and mobile 140. Wireless link 145 may comprise an uplink capable of conveying information from mobile 140 to base station 110. Wireless link 145 may comprise a downlink capable of conveying information from base station 110 to mobile 140. Wireless link 145 may use radio resources in accordance with procedures defined for the technology in use in mobile 140, cell 110C and base station 110. In this regard, wireless link 145 may use time division multiple access, TDMA, code division multiple access, CDMA, or orthogonal frequency division multiple access, OFDMA, for example.

Base station 110 may be configured to offer cellular service to a plurality of mobiles attached to cell 110C. Radio recources, such as frequency bands, of cell 110C may be divided by at least one of TDMA, CDMA and OFDMA technologies to allow simultaneous access to base station 110 by more than one mobile, such that wireless links similar to wireless link 145 connect base station 110 to each such mobile.

Base station 110 is illustrated as being connected to base station 120 via connection 119. Where base stations 110 and 120 are configured to operate in accordance with LTE technology, for example, connection 119 may comprise at least an X2 interface. Base station 120 may be configured to control cell 120C. The shape of cell 120C is illustrated as different in shape to that of cell 110C only for illustration purposes. Base station 110 is illustrated as being connected to a core network node 130 via connection 129. Base station 120 may be connected to a core network node, such as for example core network node 130, via base station 110 or via a separate connection, which is not illustrated. In an LTE example, core network node 130 may comprise a serving gateway and connection 129 may comprise a S1 interface. In a WCDMA example, core network node 130 may comprise a serving general packet radio service support node, SGSN, for example.

Base stations 110 and 120 may be configured to transmit, for example broadcast, system information, SI, to their respective cells 110C and 120C. The SI may be received by mobiles considering handover to a new cell. In some embodiments, for example a mobile moving in cell 120C toward cell 110C may notice that SI from base station 110 is trending higher in received signal power, while simultaneously SI from base station 120 is trending lower in received signal power. Such a mobile may conclude that it is moving toward cell 110C, and such a mobile may be configured to report to the network results of such signal power measurements, to trigger a handover procedure from cell 120C to cell 110C. The SI may comprise, for example, identities of cells and/or identities networks where the cells are comprised in. The SI may comprise a training sequence, or reference symbols, to allow for synchronization between mobile 140 and base station 110 or base station 120. In general, SI of a first cell may also be considered to be SI of a base station or access point controlling the first cell.

Further illustrated in FIG. 1 are local access points 105, 106 and 107 and cells controlled by them, respectively 105C, 106C and 107C. Cells controlled by local access points may also be referred to as hotspots. Local access points 105, 106 and 107 are illustrated as being connected to base station 110 via connections 1101. Connections 1101 may comprise wire-line or wireless connections. Base station 110 may be configured to control, or at least participate in controlling, the operation of local access points 105, 106 and 107. For example, base station 110 may control evolved packet system, EPS, service offloading via at least one of local access points 105, 106 and 107.

Local access points 105, 106 and 107 may be configured to each transmit, for example broadcast, system information, SI, specific to the transmitting local access point. For example, SI of a local access point may comprise an identity of the local access point or a cell controlled by the local access point, physical access information and information describing which encryption methods the local access point is capable of employing in communication with mobiles. SI of a local access point may comprise an identity of a macro cell or macro base station associated with the local access point.

When mobile 140, for example, moves within cell 110 toward local access point 107, mobile 140 may be configured to monitor for SI transmitted by base station 110 and any other SI mobile 140 may be capable of receiving. At some point during the approach toward local access point 107, mobile 140 may become capable of receiving SI from local access point 107. Responsive to determining that a handover from cell 110C to cell 107C is feasible, at least one of the network and mobile 140 may be configured to cause a handover from cell 110C to cell 107C to happen. Before the handover, mobile 140 may be capable of simultaneously receiving both SI from base station 110 and SI from local access point 107. The decision on handover to cell 107C may be based at least in part on offloading criteria, for example cost, traffic type, preference or load information of cells 110 and/or 107C. Offloading criteria may comprise logic to route certain kinds of traffic preferably via local access points rather than base stations, for example downloads of large files may be defined as preferably conducted with a local access point. Base station 110 may be considered a macro base station that is associated with each of local access points 105, 106 and 107 as it is the macro base station responsible for aspects of operation of these local access points. For example, base station 110 may be authorized to switch these local access points on and off in dependence of a load status in cell 110C.

Where a mobile, attached to a cell controlled by a local access point, such as for example cell 107C, requests a file from the internet, for example, the requested file may be delivered to the requesting mobile via core network node 103, connection 129, base station 110, connections 1101 and local access point 107. The file may be communicated from local access point 107 to the requesting mobile via a wireless link.

Wireless links between local access points and mobiles may be based on the same technology as wireless links between base stations and mobiles. Alternatively, wireless links between local access points and mobiles may be based on a different version of the same technology as wireless link 145, for example. For example, a version of the technology may be developed that is particularly well suited to shorter-range, high-bandwidth communication between a local access point and a mobile. Alternatively, where local access points are used for reasons different from increased bandwidth, different features of the technology may be emphasized. In some embodiments, wireless links between local access points and mobiles are based on different technologies.

A mobile attached to a cell controlled by a local access point may benefit from obtaining SI from the macro base station associated with the local access point controlling the cell the mobile is attached to. For example, a mobile attached to cell 107C may benefit from obtaining SI of cell 110C. The mobile may try to obtain the SI of cell 110C by listening to SI broadcast by base station 110, since cell 107C is almost entirely inside the coverage area of cell 110C. However, a section of cell 107C as illustrated in FIG. 1 isn't in the coverage area of cell 110C, and even in areas of overlapping coverage, the mobile may have to interrupt communicating with local access point 107 in order to listen to SI broadcast by base station 110. In order to obtain the SI of cell 110C, the mobile may be configured to request the SI of cell 110C from local access point 107. Local access point 107C may responsively request and obtain the SI of cell 110C from base station 110, and provide it to the requesting mobile over a wireless link connecting the mobile with local access point 107. The SI of cell 110C may be provided in cell 107C as broadcast, or as dedicated signaling addressed to the mobile requesting the SI of cell 110C. Cell 105C is illustrated in FIG. 1 as being completely outside the coverage area of cell 110C, in other words there is no overlapping coverage at all. A mobile attached to cell 105C may be unable of receiving system information of cell 110C by listening to broadcasts from base station 110. In this case requesting the SI of cell 110C from local access point 105 remains a feasible way for the mobile to obtain the SI of cell 110C. A mobile may be configured to request the SI of a macro cell controlled by a macro base station associated with a local access point which controls a cell the mobile is attached to, responsive to determining that the mobile is outside a coverage area of the macro cell.

In some embodiments, local access point 107 is configured to store as a local copy an up-to-date version of the SI of cell 110C. In this case, local access point 107 needn't request the SI of cell 110C from base station 110 responsive to receiving a request for it from a mobile, but local access point 107 may provide the requested SI from its local copy. In these embodiments, base station 110 may be configured to update the SI of cell 110C to all local access points it controls, each time base station 110 detects a change in the SI of cell 110C, or in general any cell controlled by base station 110.

One way to deliver SI of a cell controlled by the associated macro base station is for local access points to deliver complete sets of this SI to mobiles in their respective cells. For example, where SI comprises blocks or modules, a local access point may be configured to deliver a set of all such blocks, or modules, to at least some mobiles attached to a cell controlled by the local access point. A local access point may be triggered to provide to a mobile a partial or complete set of SI of a cell controlled by its associated macro base station responsive to determining, for example, that a traffic profile of the mobile changes and no longer conforms to a traffic offloading profile. Since the mobile may become a candidate to hand over to the macro cell controlled by the associated macro base station, the local access point may provide the SI, for example a complete set of the SI or sections of the SI, of the macro cell to the mobile to assist in possible handover to the macro cell.

A mobile attached to a cell controlled by a local access point may be configured to request for SI of a cell controlled by a macro base station associated with the local access point responsive to determining that a traffic profile of the mobile no longer conforms to characteristics of traffic to be offloaded. A network may define characteristics of traffic that is to be preferably offloaded to be handled by local access points.

Making SI of at least one cell controlled by an associated macro base station available to mobiles attached to cells controlled by local access points controlled at least in part by the associated macro base station may enable the mobiles to camp in the macro-level network in an idle state, while remaining attached to a cell controlled by the local access point. This may be useful for example in cases such as cell 105C of FIG. 1, wherein the mobile is rendered capable of camping in cell 110C while outside the cell coverage area of cell 110C.

A mobile attached to a cell controlled by a local access point may be configured to store SI of both cells, the one controlled by the local access point and the one controlled by the associated base station, in an internal memory. The mobile may further be configured to compare the SI to each other, and based on a determination based on the comparison, request or suggest to the network to be handed over to the macro cell controlled by the associated base station. An example of the comparison may be that the mobile determines which cell offers a more preferable type of service for the current traffic profile of the mobile. Another example is a comparison of pricing information comprised in the SI of each cell, wherein the pricing information may change dynamically.

In general there is provided a first apparatus, such as for example a mobile or a control device for inclusion in a mobile, to control the functioning of the mobile. A control device may comprise, for example, a processor, chip, chipset or a similar device. The first apparatus may comprise a receiver configured to receive information from a local access point, the information comprising system information of a macro base station associated with the local access point. Where the first apparatus is a control device, the receiver may comprise a serial port and input/output pin comprised in the control device, such that the receiver enables the control device to receive information. Alternatively the receiver may comprise a parallel port comprised in the control device. Where the first device comprises a mobile, the receiver may be comprised in a radio transceiver of the mobile, for example.

In some embodiments, in receiving the information from the local access point, at least one of the receiver is configured to receive the information responsive to a request and the information comprises full system information. In other words, in these embodiments the information is received responsive to a request, or the information comprises full system information, or the information comprises full system information received responsive to a request.

The first apparatus may comprise at least one processing core, configured to cause the first apparatus to participate in a procedure with the macro base station based at least in part on the information. For example, the first apparatus may participate in a tracking area update procedure with the macro base station, using at least in part the received information. The procedure may be conducted with the macro base station via the local access point, or over a direct wireless connection to the macro base station, for example.

In some embodiments, the receiver is further configured to receive system information of the local access point from the local access point. This may comprise receiving the system information of the local access point from a broadcast transmittion from the local access point, or from dedicated signaling from the local access point, such that the dedicated signaling is addressed to the first apparatus.

In some embodiments, the system information of the local access point comprises at least one of a local access point name, access control information, physical access parameters, control channel composition information, identities of cipher suites and a connection mode. A local access point name may comprise a service set ID, SSID, or a cell identity, for example. Access control information may comprise information defining which types of mobiles may access the local access point, or identities of mobiles which may access the local access point. Physical access parameters may comprise frequency band information and/or modulation information. Control channel composition information may define a structure of a control channel used by the local access point, for example. Cipher suites may comprise methods for securing communicated information against eavesdropping. A connection mode may comprise an identity of access type, for example it may inform mobiles that the local access point only supports background-type data connections.

In some embodiments, the procedure comprises an idle mode related procedure. Examples of idle mode related procedures include a EPS connection setup procedure and a tracking area update procedure. In some embodiments, the information is received in radio resource control, RRC, signaling directed from the local access point to the first apparatus.

In some embodiments, the receiver is configured to receive the information at a time when the first apparatus is in radio contact with the local access point but not with the macro base station. Being in radio contact may comprise at least one of bidirectional transmissions and reception of broadcasted unidirectional transmissions.

In some embodiments, the system information of the macro base station comprises at least one of cell access related information, access class barring information and cell selection information. Cell access related information may comprise information describing the identities or types of mobiles permitted to attach to the macro cell. Access class barring information may comprise information defining which type of service is barred with certain barring factor. Cell selection information may comprise information on neighbour cell lists, adjacent frequencies and/or their priorities for cell selection and reselection.

In some embodiments, the at least one processing core is configured to cause the request to be transmitted responsive to a determination concerning characteristics of data communication of the first apparatus. The determination may comprise determining that a traffic pattern of the first apparatus no longer conforms to pre-defined characteristics of traffic to be offloaded to a cell controlled by a local access point. For example, where the network has defined that background-type data traffic is preferably offloaded, and the first apparatus initiates an interactive-type data session, the request may be caused to be transmitted. In general, the request may be caused to be transmitted to the local access point.

In general there is provided a second apparatus, comprising at least one processor, at least one memory including computer program code, the second apparatus being configured to provide information comprising system information of a macro base station associated with the second apparatus to a user equipment, wherein at least one of the information is provided responsive to a request and the information comprises full system information of the macro base station. The second apparatus may be configured to receive the information from the macro base station. The second apparatus may comprise, for example, a local access point or a control device for inclusion in a local access point, to control the functioning of the local access point.

In some embodiments, the second apparatus is further configured to provide the user equipment with system information of the second apparatus, or of a cell controlled by the second apparatus.

In general there is provided a third apparatus comprising at least one processor, at least one memory including computer program code, the third apparatus being configured to provide information comprising system information of the third apparatus to a local access point communicably connected with the apparatus, wherein at least one of the information is provided responsive to a request and the information comprises full system information of the third apparatus; and participate in a procedure with a user equipment, wherein the user equipment is not in radio contact with the third apparatus. The third apparatus may comprise, for example, a macro base station or a control service for inclusion in a macro base station, to control the functioning of the macro base station. In some embodiments, the procedure comprises an idle mode related procedure.

Figure 3:
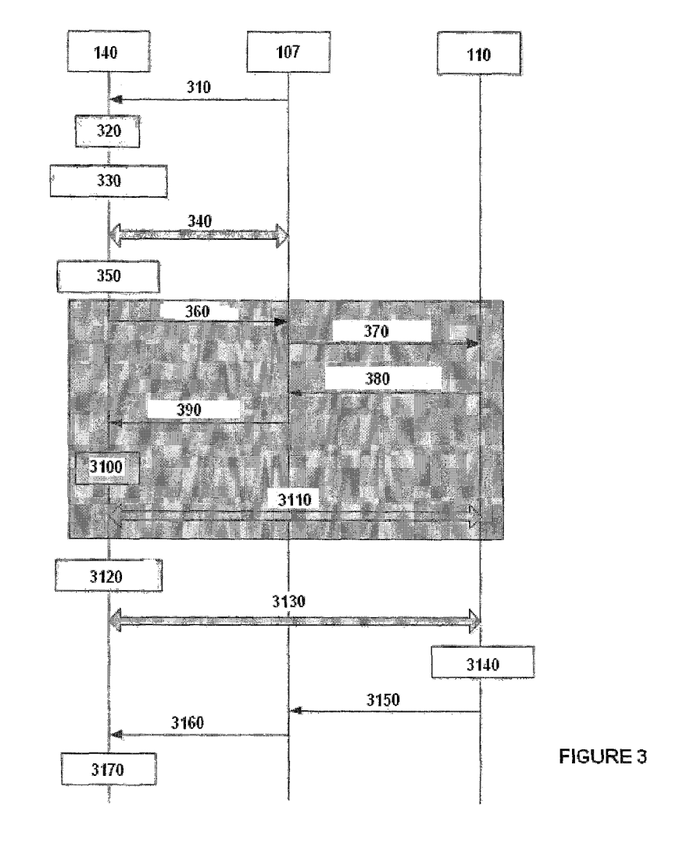
FIG. 3 is a first flow diagram showing operations in accordance with at least some embodiments of the invention.

FIG. 3 is a first flow diagram showing operations in accordance with at least some embodiments of the invention. Illustrated in FIG. 3 are mobile 140, local access point 107 and associated macro base station 110, wherein base station 110 is associated with local access point 107.

Processing commences in phase 310, where mobile 140 is provided with SI of the local access point 107, via broadcasting or directed signaling. Responsively, in phase 320, mobile 140 stores the SI received in phase 310. In phase 330 mobile 140 may decide to access services of the local access point, and responsively in phase 340 a local radio resource control, RRC, connection may be established between mobile 140 and local access point 107. Using the local RRC connection, mobile 140 may access services offered locally by local access point 107, as well as, in some embodiments, services obtainable via the local access point from the cellular network or internet, for example.

In phase 350, mobile 140 may determine that it could benefit from obtaining SI of a cell controlled by associated base station 110. Responsively, in phase 360, mobile 140 may transmit a request for SI of the associated macro base station to local access point 107. In phase 370, local access point 107 may be configured to request the SI of a cell controlled by associated macro base station 110 from associated macro base station 110. In phase 380, associated macro base station 110 may be configured to provide the requested SI to local access point 107. Alternatively to phases 370 and 380, local access point 107 may store a local copy of the SI of a cell controlled by associated macro base station 110, which associated macro base station 110 may be configured to update every time it detects a change in the SI of a cell controlled by associated macro base station 110. In phase 390, local access point 107 may be configured to provide at least part, and in some embodiments all, of the SI of associated macro base station 110 to mobile 140. Responsively to receiving the requested SI, mobile 140 is in phase 3100 in possession of at least part of the SI of a cell controlled by associated macro base station 110.

Using the SI of a cell controlled by associated macro base station 110, mobile 140 may perform, for example, a tracking area update procedure, or another procedure, with associated macro base station 110. The procedure may be conducted via local access point 107, or alternatively via a direct wireless link between mobile 140 and associated macro base station 110. Such a procedure is illustrated as phase 3110.

In phase 3120, mobile 140 may determine that it requires services of associated macro base station 110. Responsively, in phase 3130, mobile 140 may trigger initiation of a RRC connection with associated macro base station 110. The initiation may utilize at least in part the SI of a cell controlled by associated macro base station 110, which is available to mobile 140 following phase 3100. In phase 3140, SI of a cell controlled by associated macro base station 110 is updated, for example due to a change of network traffic conditions and Radio Resource Management strategy. Responsively, associated macro base station 110 may be configured to inform mobile 140 of the updated SI by signaling via local access point 107, which is illustrated in phases 3150 and 3160. Mobile 140 is in possession of the updated SI of a cell controlled by associated macro base station 110 in phase 3170. Phases 3110 to 3170 are optional.

Figure 4:
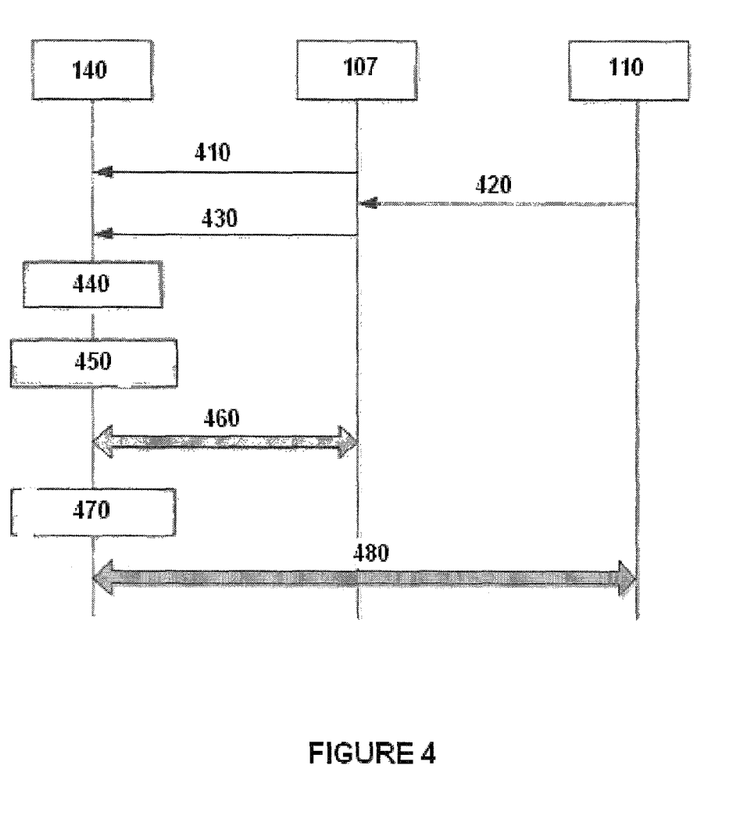
FIG. 4 is a second flow diagram showing operations in accordance with at least some embodiments of the invention.

FIG. 4 is a second flow diagram showing operations in accordance with at least some embodiments of the invention. Mobile 140, local access point 107 and associated macro base station 110 are illustrated at the top as in FIG. 3. In phase 410, local access point 107 may be configured to provide mobile 140 with its own SI, in other words SI of local access point 107. The providing of phase 410 may take place by broadcasting or by signaling directed to mobile 140. In phase 420, associated macro base station 110 may be configured to provide its own SI to local access point 107. In phase 430, local access point 107 may be configured to provide the SI it received in phase 420 to mobile 140. The providing of phase 430 may take place by broadcasting or by signaling directed to mobile 140. As a result of phases 410 and 430, in phase 440 mobile 140 is in possession of both SI of local access point 107, and SI of a cell controlled by associated macro base station 110.

In phase 450, mobile 140 may be configured to determine it needs services of local access point 107. Responsive to phase 450, mobile 140 may be configured to initiate establishment of a RRC connection between mobile 140 and local access point 107, which is illustrated as phase 460. In phase 470, mobile 140 may be configured to determine it needs services of associated macro base station 110. Responsive to phase 470, mobile 140 may be configured to initiate establishment of a RRC connection between mobile 140 and associated macro base station 110. The establishment of phase 460 may rely at least in part on the SI of local access point 107. The establishment of phase 480 may rely at least in part on the SI of a cell controlled by associated macro base station 110.

Figure 5:
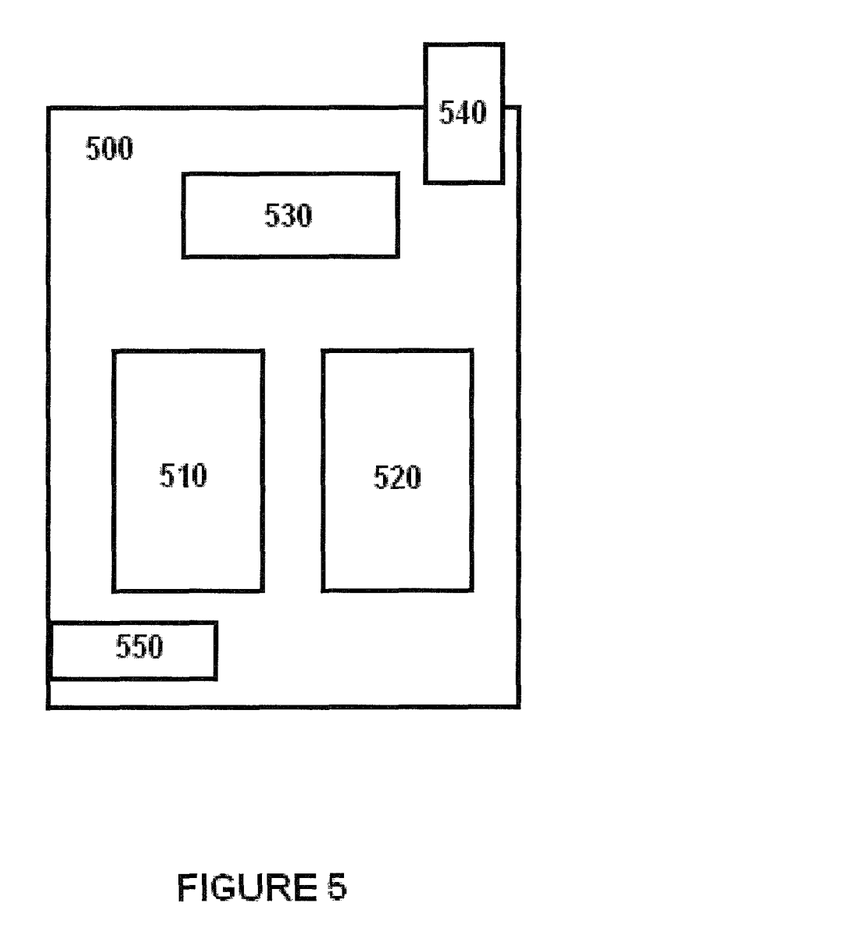
FIG. 5 illustrates a block diagram of an apparatus such as, for example, a local access point or base station, in accordance with an example embodiment of the invention.

FIG. 5 illustrates a block diagram of an apparatus 500 such as, for example, a local access point or base station, in accordance with an example embodiment of the invention. Illustrated is apparatus 500 comprising a control device 510, wherein control device 510 may comprise, for example, at least one processor, at least one processing core, a chip or chipset, an application-specific integrated circuit, field-programmable gate array, at least one controller or another device capable of controlling the operation of apparatus 500. Apparatus 500 comprises further memory 520. Memory 520, which may be partially comprised in control device 510, is configured to store information relating to operating apparatus 500. Such information may comprise, for example, computer program code designed to cause apparatus 500 to perform methods within the scope of the invention. Memory 520 may also store operational information, such as for example system information of apparatus 500. Memory 520 may comprise a solid-state memory, a magnetic memory, or a holographic memory medium, for example. Apparatus 500 may comprise further a radio transceiver 530, wherein radio transceiver is configured to communicate with nodes, for example mobile nodes, using a wireless radio technology such as, for example, WCDMA or LTE. Apparatus 500 may comprise further antenna module 540, which may comprise at least one antenna configured to provide signals to radio transceiver 530, and to provide for transmission or radio waves from radio transceiver 530. Apparatus 500 may comprise further interface 550. Where apparatus 550 corresponds to base station 110 of FIG. 1, for example, interface 550 may provide for connectivity toward core network node 130 via interface 129. In some embodiments, interface 550 may comprise an Ethernet interface, a standardized interface or a proprietary interface, for example.

Figure 6:
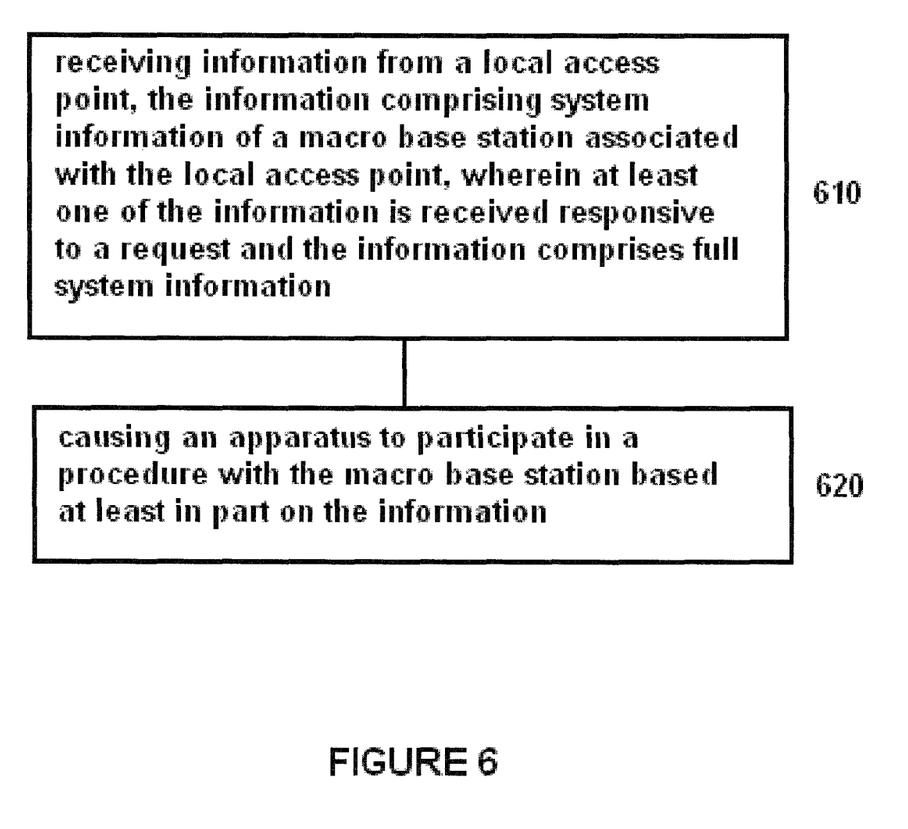
FIG. 6 is a third flow diagram showing operations in accordance with at least some embodiments of the invention.

FIG. 6 is a third flow diagram showing operations in accordance with at least some embodiments of the invention. Phase 610 comprises receiving information from a local access point, the information comprising system information of a macro base station associated with the local access point, wherein at least one of the information is received responsive to a request and the information comprises full system information. Phase 620 comprises causing an apparatus to participate in a procedure with the macro base station based at least in part on the information. The method of FIG. 6 may be performed in a mobile 140, for example.

Figure 2:
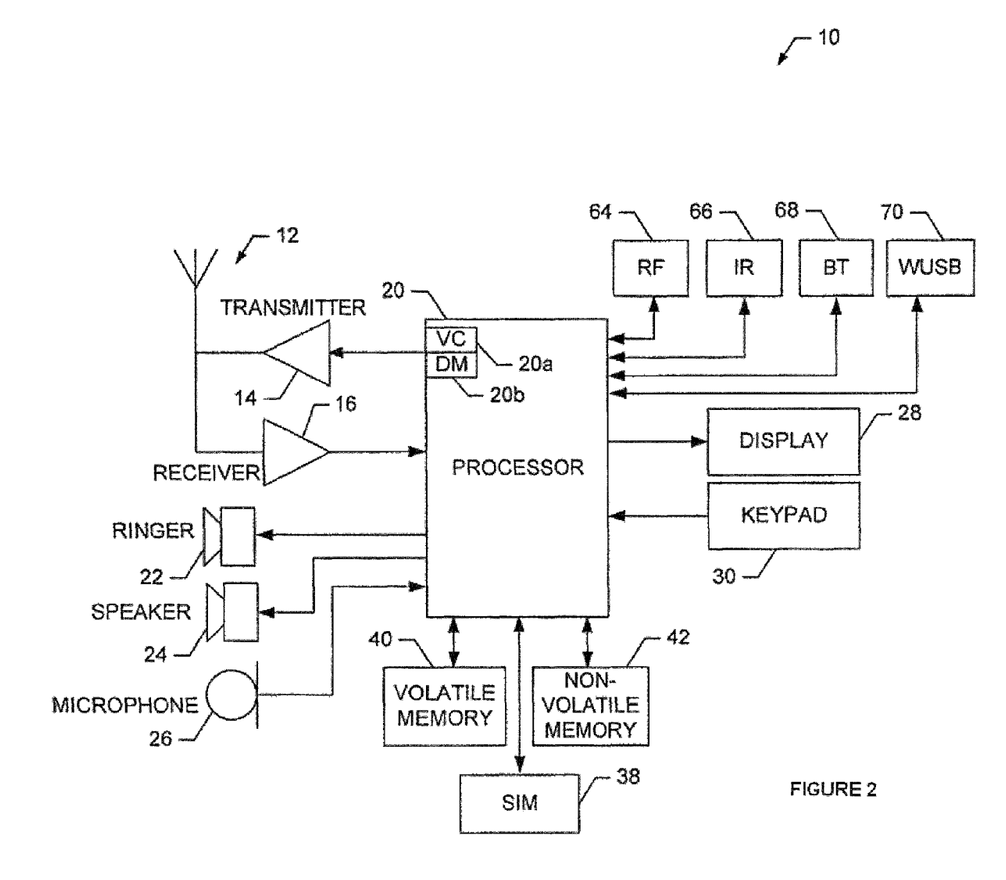
FIG. 2 illustrates a block diagram of an apparatus such as, for example, a mobile, in accordance with an example embodiment of the invention.

FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that handover, or re-selection, to a macro cell is facilitated. Another technical effect of one or more of the example embodiments disclosed herein is that different traffic types may be more advantageously offloaded to local access points. Another technical effect of one or more of the example embodiments disclosed herein is that mobiles are made capable of camping on macro cells even outside the coverage area of the macro cell, improving network coverage and efficiency.

Embodiments of the present invention may be implemented in software, hardware, application logic or a combination of software, hardware and application logic. The software, application logic and/or hardware may reside on memory 40, processor 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor;
memory storing a program of instructions;
wherein the memory storing the program of instructions is configured to, with the at least one processor, cause the apparatus to at least:
at a user device in radio contact with a local access point, request system information from a macro base station via the local access point, the information comprising system information of a local access point associated with the macro base station, wherein the system information comprises system information of at least one local access point other than the local access point with which the user equipment is in radio contact;
receive the information from the macro base station via the local access point with which the user device is in radio contact; and
participate in a procedure with the local access point based at least in part on the information.

2. An apparatus according to claim 1, wherein the system information comprises at least one of a local access point name, access control information, physical access parameters, control channel composition information, identities of cipher suites and a connection mode.

3. An apparatus according to claim 1, wherein the procedure comprises an idle mode related procedure.

4. An apparatus according to claim 1, wherein the information is received using radio resource connection signaling.

5. An apparatus according to claim 1, wherein the system information is received from the local access point while the apparatus is in radio contact with the local access point and the apparatus is not in radio contact with the macro base station.

6. An apparatus according to claim 1, wherein the apparatus comprises a mobile communication device, the apparatus further comprising an antenna and a receiver coupled to the antenna, and wherein the antenna is configured to provide signals for use by the at least one processor.

7. A method, comprising:
at a user device in radio contact with a local access point, requesting information from a macro base station via the local access point, the information comprising system information of a local access point associated with the macro base station, wherein the information is received responsive to a request from the local access point and the information comprises system information, wherein the system information comprises system information of at least one local access point other than the local access point with which the user equipment is in radio contact;
receiving the information from the macro base station, wherein the information is received at the user device, via the local access point with which the user device is in radio contact; and
causing the user device to participate in a procedure with the local access point based at least in part on the information.

8. A method according to claim 7, wherein the system information comprises at least one of a local access point name, access control information, physical access parameters, control channel composition information, identities of cipher suites and a connection mode.

9. A method according to claim 7, wherein the procedure comprises an idle mode related procedure.

10. A method according to claim 7, wherein the information is received using radio resource connection signaling.

11. A method according to claim 7, wherein the system information is received from the local access point while the apparatus is in radio contact with the local access point and the apparatus is not in radio contact with the macro base station.

12. A computer program product comprising at least one non-transitory computer-readable storage medium storing a program of instructions, execution of which by at least one processor configures an apparatus to at least:
at a user device in radio contact with a local access point, request system information from a macro base station via the local access point with which the user device is in radio contact, the information comprising system information of a local access point associated with the macro base station, wherein the system information comprises system information of at least one local access point other than the local access point with which the user equipment is in radio contact;
receive the information from the macro base station; and
participate in a procedure with the local access point based at least in part on the information.

13. The computer program product of claim 12, wherein the system information of the local access point comprises at least one of a local access point name, access control information, physical access parameters, control channel composition information, identities of cipher suites and a connection mode.

14. The computer program product of claim 12, wherein the procedure comprises an idle mode related procedure.

15. The computer program product of claim 12, wherein the information is received using radio resource connection signaling.

16. The computer program product of claim 12, wherein the system information is received from the local access point while the apparatus is in radio contact with the local access point and the apparatus is not in radio contact with the macro base station.

* * * * *

UNITED STATES PATENT AND TRADEMARK OFFICE
CERTIFICATE OF CORRECTION

PATENT NO. : 9,756,536 B2
APPLICATION NO. : 14/411412
DATED : September 5, 2017
INVENTOR(S) : Li et al.

It is certified that error appears in the above-identified patent and that said Letters Patent is hereby corrected as shown below:

In Claim 13, Column 16, Line 25 "of the local access point" should be deleted.

Signed and Sealed this
First Day of May, 2018

Andrei Iancu
*Director of the United States Patent and Trademark Office*